United States Patent
Schuh

[11] Patent Number: 6,000,445
[45] Date of Patent: Dec. 14, 1999

[54] FLOUR-LOADING SYSTEM

[76] Inventor: Matthias Schuh, Buchenstrasse 13, 84101 Obersuessbach, Germany

[21] Appl. No.: 09/091,321
[22] PCT Filed: Dec. 18, 1996
[86] PCT No.: PCT/EP96/05694
    § 371 Date: Jun. 15, 1998
    § 102(e) Date: Jun. 15, 1998
[87] PCT Pub. No.: WO97/22857
    PCT Pub. Date: Jun. 26, 1997

[30]   Foreign Application Priority Data

Dec. 20, 1995 [DE] Germany ............................ 195 47 771
Jan. 12, 1996 [DE] Germany ............................ 196 00 971

[51] Int. Cl.⁶ ................................. B65B 1/32; B65B 1/06
[52] U.S. Cl. .................... 141/83; 141/85; 141/104; 141/192; 141/283; 141/325; 414/21; 414/328; 414/401
[58] Field of Search ............................. 141/83, 283, 104, 141/103, 100, 129, 186, 192, 250, 267, 325, 331, 333, 231, 232, 69, 85; 177/52, 116, 119, 132, 133, 134, 135, 136, 145; 414/401, 21, 328

[56]   References Cited

U.S. PATENT DOCUMENTS 4,460,308   7/1984   Moon et al. ........................... 414/786

*Primary Examiner*—Henry J. Recla
*Assistant Examiner*—Peter de Vare

[57]   ABSTRACT

An apparatus for the loading of flour at a mill having at least one filling nozzle, which communicates by way of at least one substantially stationary storage container, a silo or a hopper, and is so constructed that it can be coupled to several input openings of a vehicle to be loaded. In order to connect the filling nozzles to the various input openings of the vehicle to be loaded in succession (or simultaneously), the weighing assembly, which measures the weight of the vehicle together with its load, is constructed so that it incorporates a transport means, in such a way that by moving the vehicle its input openings can be connected in sequence to the filling nozzle for rapid loading of flour in a simple manner. The flour, in particular in a fluidized state, can be conducted though vertical chutes, increasing the control over the amounts loaded into the vehicle and decreasing the possibility of contamination.

13 Claims, 3 Drawing Sheets

FLOUR-LOADING SYSTEM

FIELD OF THE INVENTION

The invention relates to a flour-loading apparatus having at least one filling nozzle (10–13) which, by way of at least one gate (14), communicates with a substantially stationary flour hopper (15–18) and is so constructed that it can be coupled to several tank openings (30–36) of a vehicle (29) to be loaded, and a weighing assembly (40) that measures the filled weight of the vehicle (29) such as is customarily used in a modern flour mill.

BACKGROUND OF THE INVENTION

A known apparatus of this kind is described in the following with reference to the attached FIG. 3. It comprises overhead hoppers 15, 16, 17 and 18, into which is transferred the flour from the mill's silos (not shown) prior to loading into a vehicle 29. From the hoppers 15–18 the flour passes through gates 14 attached to each of the hoppers 15–18, into a first (chain trough) conveyor 22 and thence into a second (chain trough) conveyor 23, which is displaceable (from left to right in FIG. 3). The conveyor 23 is equipped at each of its two ends with a filler nozzle 10 or 11, and is so constructed that it can convey the flour either to the nozzle 10 (on the right in FIG. 3) or to the nozzle 11 (on the left in FIG. 3). Below the arrangement just described, in particular substantially centered below the connection point of the first conveyor 22, is a weighing assembly 40 to provide a means of weighing vehicles, onto the bridge 47 of which the vehicle 29 can be placed. The bridge 47 rests on weighing cells 48 that are seated on a foundation 50.

The vehicle 29 comprises tank input openings 30–36, through which tanks 37, 38 of the vehicle 29 can be filled. The tanks 37, 38 can be subdivided into individual compartments, sealed off from one another, in which case each input opening 30–36 is associated with a single compartment.

The first step in filling is that the nozzle 10 or the nozzle 11 is firmly connected to one of the input openings 30–36 of the vehicle 29 by appropriately shifting the second conveyor 23 and lowering the nozzle 10 or 11. Then at least one of the gates 14 of one of the hoppers 15–18 is opened and the associated first conveyor 22 is put into operation, as well as the second conveyor 23 (being moved in the appropriate direction). Hence the flour can pass into the tanks 37, 38 of the vehicle 29. During the filling process the load is measured by the weighing assembly 40. In order for a predetermined amount of flour to be put into the tanks 37, 38 of the vehicle 29, the previously opened gate 14 must be shut at just the right time, so that the amount of flour in the entire passageway from the gate 14 to the filling nozzle 10 or 11 corresponds precisely to the difference between the actual content of the tank and the desired "control" content. This precision is made particularly difficult to achieve by the fact that the distance through the second conveyor 23 depends on whether the nozzle 10 or 11 is being used and to which of the tank openings 30–36 it is coupled; that is, the conveyor can contain various amounts in transport. Furthermore, this differential amount depends on the rate of transport of the conveyors 22, 23, so that good reproducibility of the results requires extremely precise transport velocity. These criteria are very hard to meet, especially in combination, with the result that the content of the tanks is seldom exactly as intended.

An additional problem in the known flour-loading apparatus is that the conveyors, in particular, are constructed with very many angles and corners to which access is difficult. In such angles and corners animal pests can shelter or develop, whereupon they continually contaminate the flour. At the same time, physical contaminants (foreign bodies, abrasion detritus) are unavoidably introduced by the known flour-loading apparatus.

Along with all these difficulties, the time required to load a vehicle must be made as short as possible so that a given flour-loading apparatus can load as many vehicles as possible per day; to handle the output of a large mill, it is often necessary for several flour loaders to operate simultaneously.

SUMMARY OF THE INVENTION

The object of the invention is to develop a flour-loading apparatus of the kind described above so as to enable substantially contamination-free, rapid loading of flour in a simple manner.

This object is achieved by constructing the weighing assembly so that it incorporates a transport means, in such a way that by moving the vehicle its input openings can be connected in sequence to the filling nozzle.

It is an essential point of the invention that the flour is not transported horizontally; instead, the vehicle is positioned relative to the filling nozzle or nozzles in such a way that the flour (in particular, in a fluidized condition) can flow freely downward. This positioning is made possible by moving the weighbridge along with the vehicle. By relatively simple means that are known per se, this arrangement enables the vehicle to be moved into place with extreme precision, ensuring that the nozzles are very exactly aligned with the tank openings. The weighing assembly here is under adjustable control and is so constructed that the vehicle is shifted by predetermined distances, corresponding to the distances between the various tank input openings. In this way a single filling nozzle can be connected in sequence, but nevertheless very rapidly, to different input openings.

The weighing mechanisms are preferably connected (by signal lines) to the gate and are so constructed that the gate closes after the vehicle has reached a predetermined control weight. Because in this arrangement no active conveyor means (e.g., chain trough conveyors) need be provided, because the flour merely flows downward, the amount of flour that continues to enter the tank after the gate has closed is extremely slight. Furthermore, this small amount is very constant because of the constancy of its (falling) path, so that the control tank content can be achieved very precisely.

Preferably the flour is put into hoppers by way of a dust-removal and/or sifting process. It is also possible to fill the vehicle directly from the mill silos, if an appropriate pipeline is provided.

Preferably there is disposed ahead of the filling nozzle, or ahead of the hopper, an Entoleter or similar sterilizing device (in particular a mechanical sterilizer) to sterilize the flour as well as a flat sifter. These measures ensure that absolutely uncontaminated flour, and hence flour highly resistant to spoilage, is put into the vehicle to be loaded. Freedom from contamination is guaranteed in particular by the fact that in the arrangement disclosed here the flour can flow freely and the transport routes are, so to speak, "self cleaning". There is no opportunity for pollutants of whatever kind to be introduced. There are no "dead corners" in which pests can develop. In the previously known flour-loading equipment this was not the case, so that the highly resistant flour loaded with the flour-loading apparatus disclosed here is in itself a previously unknown special feature.

DETAILED DESCRIPTION OF THE INVENTION

Figure 3:
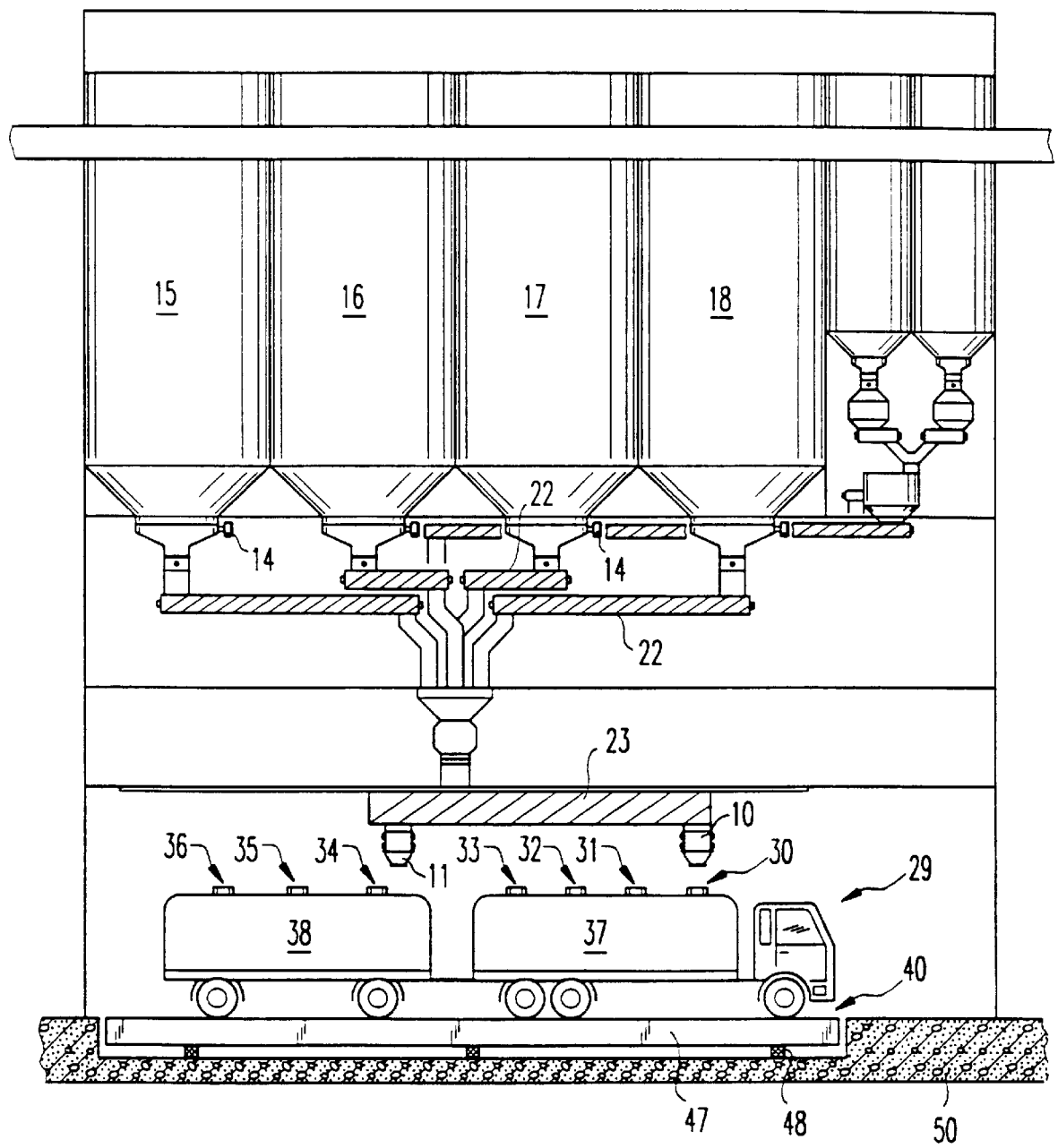
FIG. 3 is a diagram of a known flour-loading apparatus.

In the following description the same parts, and parts with the same action, are indicated by the same reference numerals. This also applies to the individual parts shown in FIG. 3 and described initially.

Figure 1:
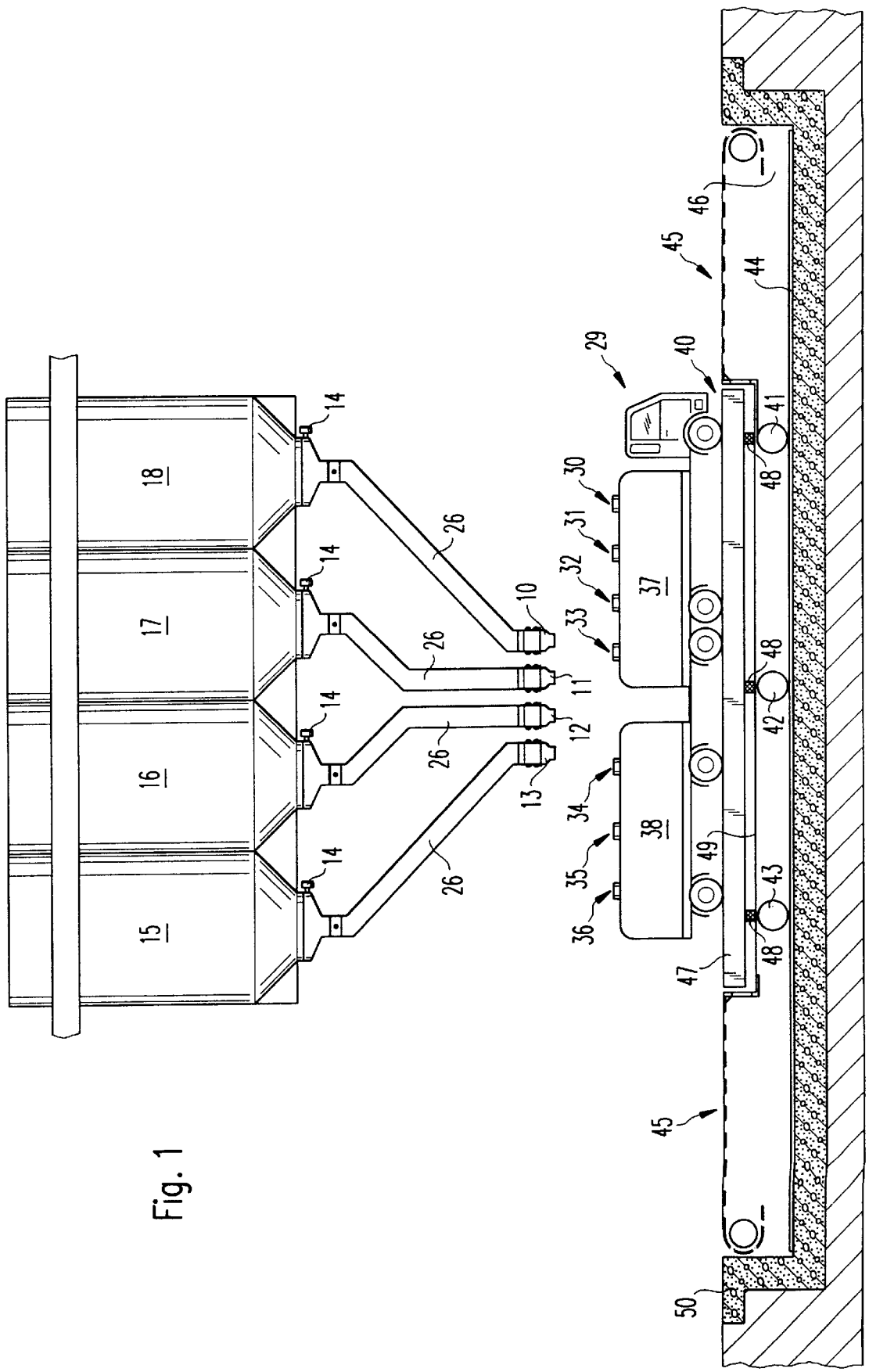
FIG. 1 shows a first embodiment of the invention in a schematized, partially sectioned side view.

In the embodiment of the invention shown in FIG. 1, an array of hoppers 15–18, each with a gate 14 disposed beneath it, is disposed in a loading-station building (not shown). The gates 14 associated with these hoppers 15–18 are all separate from one another, and each is connected by way of a chute 26 to a filling nozzle 10, 11, 12 or 13. The filling nozzles 10–13 in the embodiment shown here are linked together in such a way that they are spaced apart by the standard separation distance between tank input openings 30–33 of a vehicle 29.

Below the hoppers 15–18, in a pit 46 within a foundation 50, a weighing assembly 40 is disposed, the bridge 47 of which is mounted by way of weighing cells 48 on a stand 49, which in turn rests on rollers 41, 42 and 43. The rollers 41–43 run on rails 44 that are attached to the foundation 50. To move the bridge 47 along with its stand 49, electromotors (not shown) are provided, and measurement devices are also provided to monitor precisely the position of the bridge 47 relative to the foundation 50.

In addition, a covering panel 45 can be provided together with the stand 49, to cover the pit 46 if the latter is so deep that safety considerations require it to be covered.

The procedure of loading a vehicle is as follows. First the vehicle is positioned on the docked bridge 47. The bridge 47 is then shifted far enough that at least one of the filling nozzles 10–13 is brought into direct communication with one of the tank input openings 30–36. As soon as this has been accomplished, the corresponding gate 14 can be opened, so that flour flows out of one of the hoppers 15–18 into the tanks 37, 38 of the vehicle 29. As soon as it is determined by way of the weighing assembly 40, or its weighing cells 48, that the current tank content plus the (precalculated) amount of flour between the gate 14 and the associated filling nozzle 10 corresponds to the control tank content, the corresponding gate 14 is closed, so that the filling process is interrupted. After the nozzle 10–13 that has been in use is decoupled from the associated tank input opening 30–36, the bridge 47 is moved, if necessary, in such a way as to position the nozzle 10–13 that is now to be used over the tank input opening 30–36 to which it is now to be coupled. The process just described is then repeated. An especially favorable aspect of this arrangement is that a highly precise positioning of one of the nozzles 10–13 with respect to one of the openings 30–36 under manual control (or by way of signals from photoelectric barriers or the like) needs to be carried out only once. After an initial adjustment by this means, the bridge 47 can be repositioned in accordance with the known distances between the tank input openings 30–36; that is, it can be moved by calculated amounts.

Another embodiment of the invention will now be described with reference to FIG. 2. As shown in this drawing, above the hoppers 15 and 16 there is disposed a dust-removal unit 19, below which is a sifting unit 20 and, between the latter and the hoppers 15, 16, an Entoleter 21. The flour passing from the silo (not shown) into this arrangement is first de-dusted (unit 19), then again sifted (flat sifter 20). Finally whatever animal pests are still present in the flour (in particular their eggs) are killed in the Entoleter 21, so that the flour entering the hoppers 15, 16 remains resistant to the development of storage pests, in particular from eggs, for long periods (storable on average for 18 months or more).

This drawing also shows a pipeline 25 leading to the filling nozzle 10, which can be attached to the Entoleter, bypassing the hoppers 15 and 16. This conduit makes it possible to fill the vehicle 29 directly from a silo with flour that has been made highly resistant. It is of course also possible to use the pipeline 25 to fill the vehicle 29 directly from one of the silos (not shown) without further processing.

Figure 2:
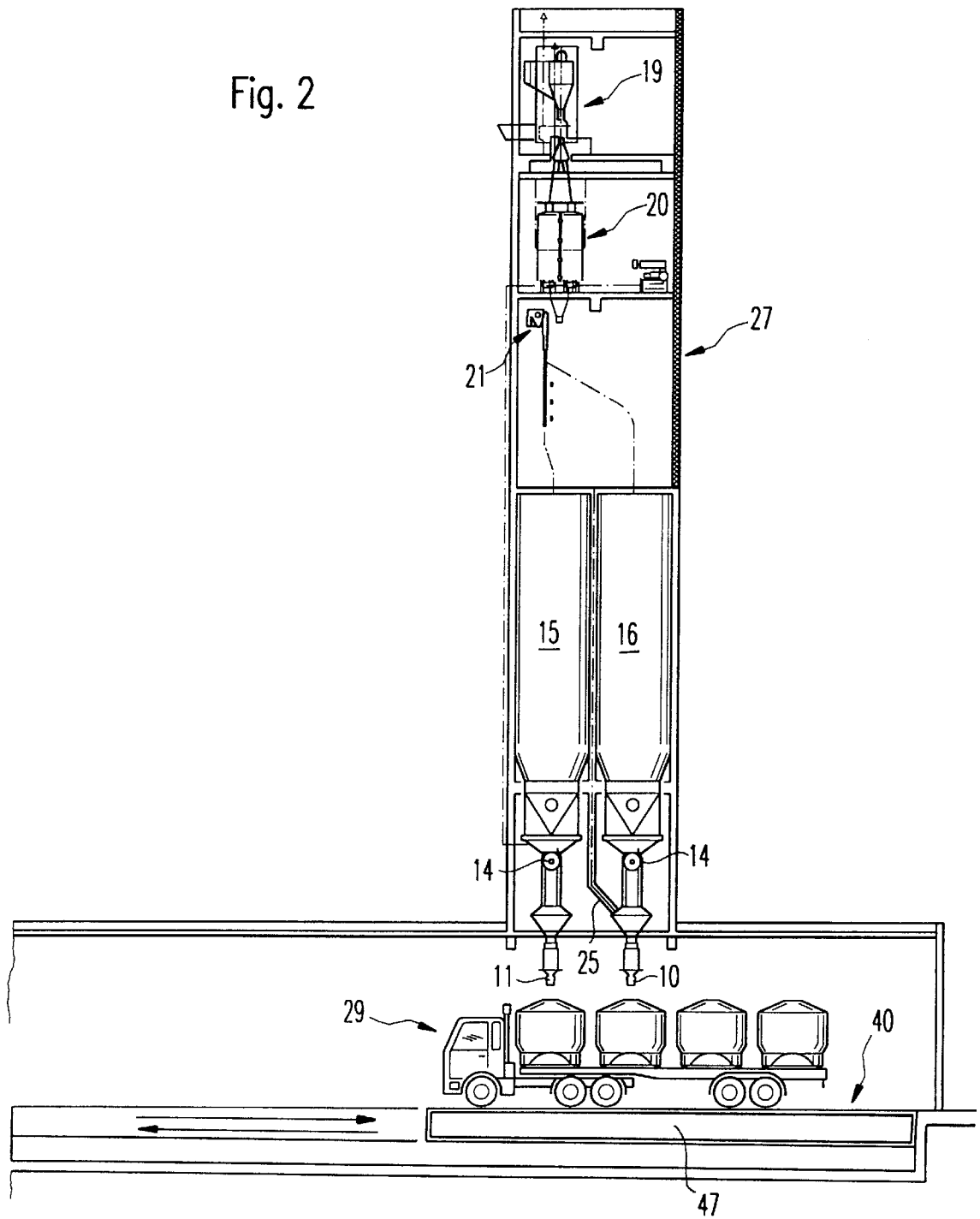
FIG. 2 shows another embodiment of the invention in a representation like that of FIG. 1.

The entire structure identified in FIG. 2 by the reference numeral 27 is preferably so constructed that it can be sealed off, to enable thermal pest control by heating the structure together with the devices contained therein.

LIST OF REFERENCE NUMERALS 10, 11, 12, 13 Filling nozzles
14 Gate
15, 16, 17, 18 Hoppers
19 Dust-removal unit
20 Sifting unit
21 Entoleter
22 First conveyor
23 Second conveyor
25 Bypass pipeline
26 Chute
27 Loading structure
29 Vehicle
30, 31, 32, 33, 34, 35, 36 Tank input opening
37 Tank
38 Tank
40 Weighing assembly
41 Roller
42 Roller
43 Roller
44 Rail
45 Covering panel
46 Pit
47 bridge
48 Weighing cell
49 Stand
50 Foundation

I claim:

1. Flour-loading apparatus, comprising at least one filling nozzle (10–13) which, by way of at least one gate (14), communicates with a substantially stationary flour hopper (15–18) adapted to be coupled to several tank input openings (30–36) of a vehicle (29) to be loaded, and a weighing assembly (40) for measuring the filled weight of the vehicle (29), wherein:

said weighing assembly (40) comprises a transport apparatus (41–49) that moves the vehicle (29) together with said weighing assembly (40) for allowing its tank input openings (30–36) to be connected in sequence to the filling nozzles (10–13) and for measuring the weight of the vehicle (29) during filling with flour.

2. Flour-loading apparatus according to claim 1, characterized in that the weighing assembly (40) comprises an adjustable controller and is so constructed that the vehicle (29) can be moved by predetermined distances that correspond to the distances separating the various tank input openings (30–36).

3. Flour-loading apparatus according to claim 1, characterized in that the weighing assembly (40) is connected to the gate (14) in such a way that the gate (14) is closed after a predetermined control weight has been reached.

4. Flour-loading apparatus according to claim 1, characterized in that it is so constructed and arranged that between the hopper (15–18) and the filling nozzles (10–13) no active conveyor means are required.

5. Flour-loading apparatus according to claim 1, characterized in that the flour is capable of being filled into the hopper (15–18) by way of a dust-removal unit (19) and/or a sifting unit (20).

6. Flour-loading apparatus according to claim 1, characterized in that for the purpose of sterilizing the flour a sterilization device (21) and a sifter (20) are disposed ahead of the filling nozzles (10–13), and where appropriate ahead of the hopper (15–18).

7. Flour highly resistant to spoilage, characterized in that it is treated and loaded by means of an apparatus according to claim 6.

8. Flour-loading apparatus according to claim 6, wherein the sterilization device comprises an Entoleter (21).

9. Flour-loading apparatus according to claim 6, wherein the sifter (20) comprises a flat sifter.

10. Apparatus for loading flour into a vehicle, comprising:

at least one flour hopper;

a gate connected to said hopper for metering flour;

a nozzle connected to said hopper by said gate for dispensing flour into the vehicle;

a weighing assembly for weighing the vehicle to determine a quantity of flour dispensed; and a transport apparatus for moving said weighing assembly together with the vehicle to bring said nozzle into alignment with the vehicle.

11. The apparatus of claim 10, including multiple nozzles connected to respective multiple hoppers and gates, and wherein said transport apparatus aligns the vehicle with multiple nozzles.

12. Method of loading flour into a vehicle comprising the steps of:

filling the hopper with flour;

driving the vehicle onto a weighing assembly;

moving the weighing assembly together with the vehicle to bring the vehicle into alignment with a nozzle;

permitting flour to flow into the vehicle by opening a gate between the nozzle and the flour hopper; and weighing the vehicle to determine an amount of flour loaded.

13. The method of claim 12 including the step of moving the weighing assembly to bring another portion of the vehicle into alignment with the nozzle.

* * * * *